Figure 1:
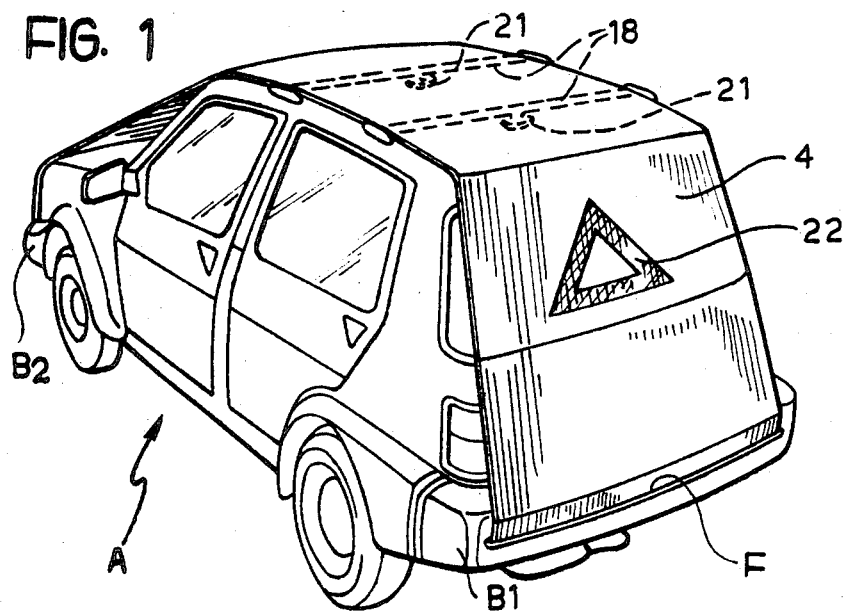

United States Patent [19]

Farina

[11] Patent Number: 4,720,135

[45] Date of Patent: Jan. 19, 1988

[54] PROTECTIVE DEVICE FOR A MOTOR VEHICLE

[76] Inventor: Fernando Farina, Via Parucco 51, Pianezza (Torino), Italy

[21] Appl. No.: 928,484

[22] Filed: Nov. 10, 1986

[30] Foreign Application Priority Data

Nov. 11, 1985 [IT] Italy .................. 54025/85[U]

[51] Int. Cl.⁴ ............................................. B60J 11/00
[52] U.S. Cl. .................................... 296/136; 296/161
[58] Field of Search ................... 296/136, 161, 163; 293/117; 135/88

[56] References Cited

U.S. PATENT DOCUMENTS

| | | | |
|---|---|---|---|
| 1,719,055 | 7/1929 | Herzer | 296/136 |
| 1,918,423 | 7/1933 | Persinger | 296/136 |
| 2,688,513 | 9/1954 | Poirier | 296/136 |
| 4,222,601 | 9/1980 | White et al. | 296/37.16 |

*Primary Examiner*—Robert R. Song
*Attorney, Agent, or Firm*—Sughrue, Mion, Zinn, Macpeak, and Seas

[57] ABSTRACT

A protective device for a motor vheicle comprises a protective sheet for covering the bodywork of a motor vehicle. The sheet is anchored at one end to a winding roller arranged to be fixed permanently to the vehicle in the region of one of its bumpers and is provided at its other end with means for attachment to the region of the other bumper.

4 Claims, 6 Drawing Figures

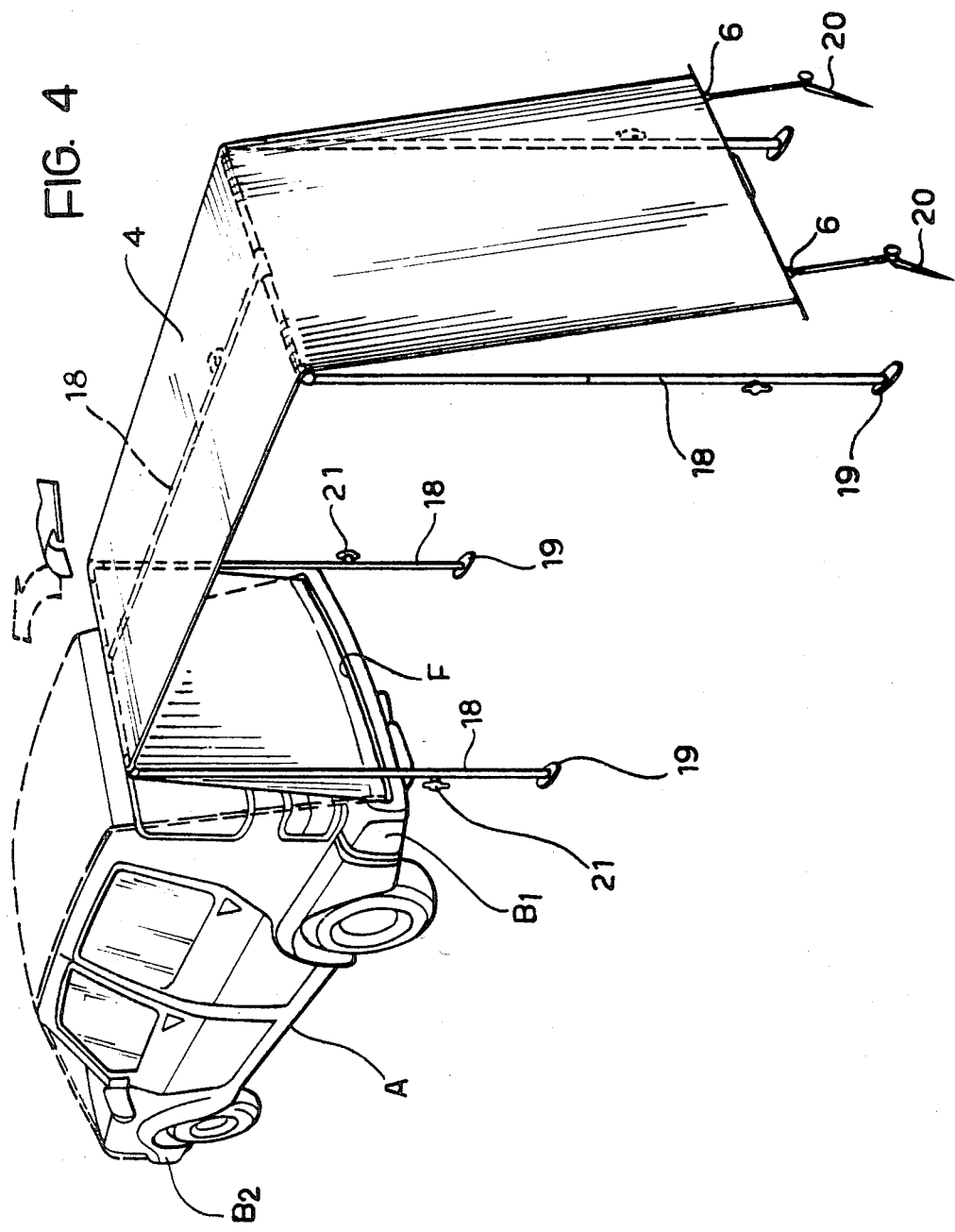

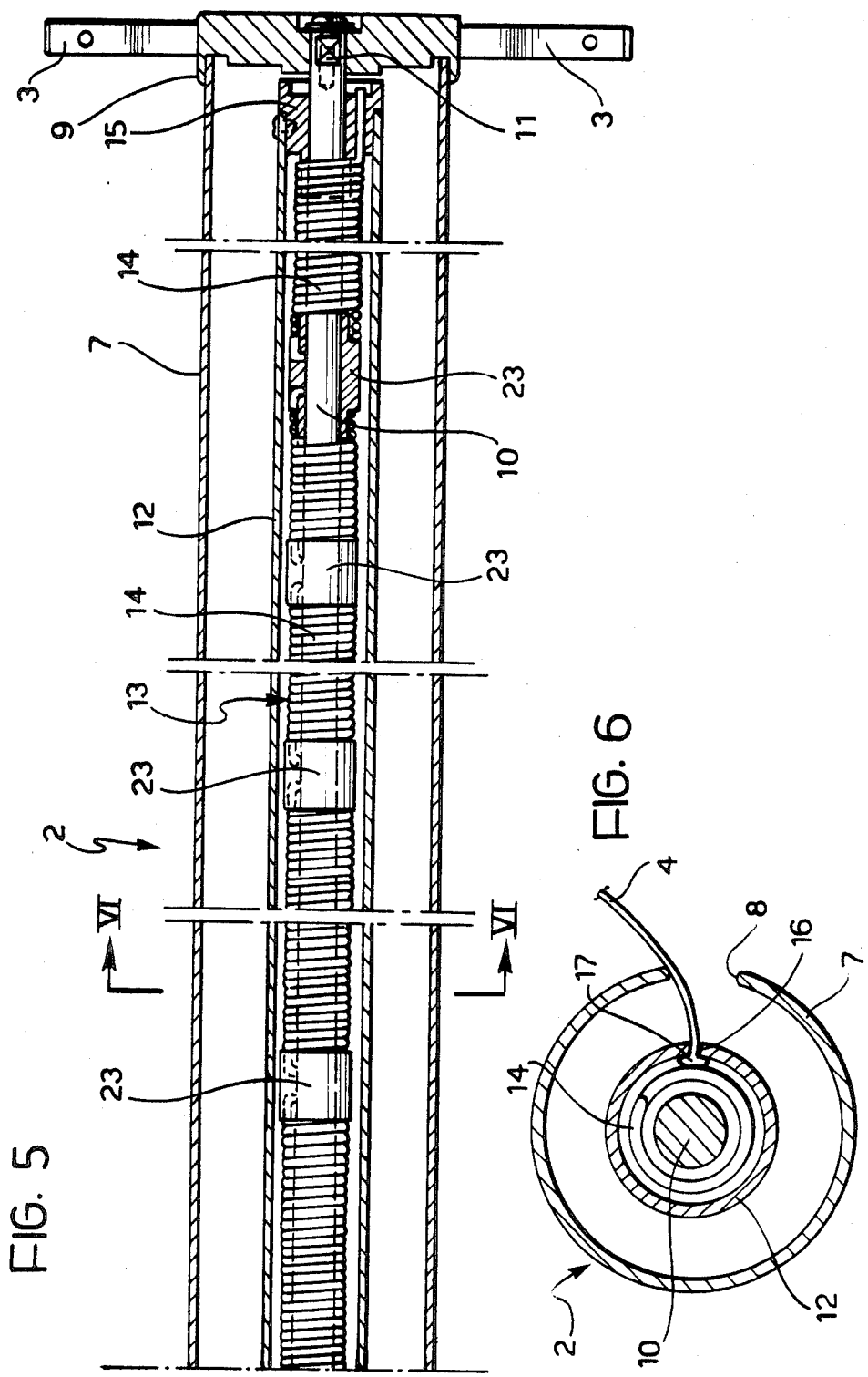

PROTECTIVE DEVICE FOR A MOTOR VEHICLE

The present invention relates to motor-vehicle protective devices of the type comprising a flexible cover for covering the bodywork of a motor vehicle.

In known protective devices of the type specified above the flexible cover is usually constituted by a wrapper which requires long and laborious operations to fit and remove it. Moreover, in order for the flexible cover to be put away, it must be folded carefully and, in this condition, is of such a size that its bulk causes obvious problems with regard to its stowage and transport on the vehicle.

The object of the present invention is to avoid these disadvantages and to provide a protective device of the type defined at the beginning which, on the one hand, is usable extremely conveniently, practically and easily and, on the other hand, is easy to transport on the vehicle without any problem of bulk.

According to the invention this object is achieved by virtue of the fact that the flexible cover of the protective device comprises a protective sheet having one end anchored to a winding roller adapted for fixing permanently to the vehicle in the region of one of its bumpers parallel thereto, and the other end of which has means for anchoring it to the region of the other bumper of the vehicle to retain it in its condition of use.

By virtue of this characteristic, the application and removal of the cover are extremely easy and do not require any manoeuvre other than the unwinding of the sheet from the roller and its hooking to the other end of the vehicle and its unhooking and rewinding on the roller respectively.

Moreover, the permanent fixing of the roller to the vehicle means that the cover is available to be arranged rapidly in any eventuality, for example in the case of an unexpected hail storm or a stop in the sun during a long journey.

According to the invention, the winding roller may be of the spring-return type or of the type with a re-winding handle or it may even have an electric motor for rewinding it.

According to another advantageous characteristic of the invention, the portective device has rods which can be used as support poles for supporting the sheet as an elongation of the vehicle to which the winding roller is fixed in use.

Thus the protective sheet may usefully be used, as an alternative, as a serviceable canopy.

These rods may conveniently have rests so that they can be positioned on the roof of the vehicle to keep the corresponding portion of the sheet spaced from the roof itself in the condition of use.

It is thus possible to protect the roof of the vehicle more effectively against hail.

Figure 2:
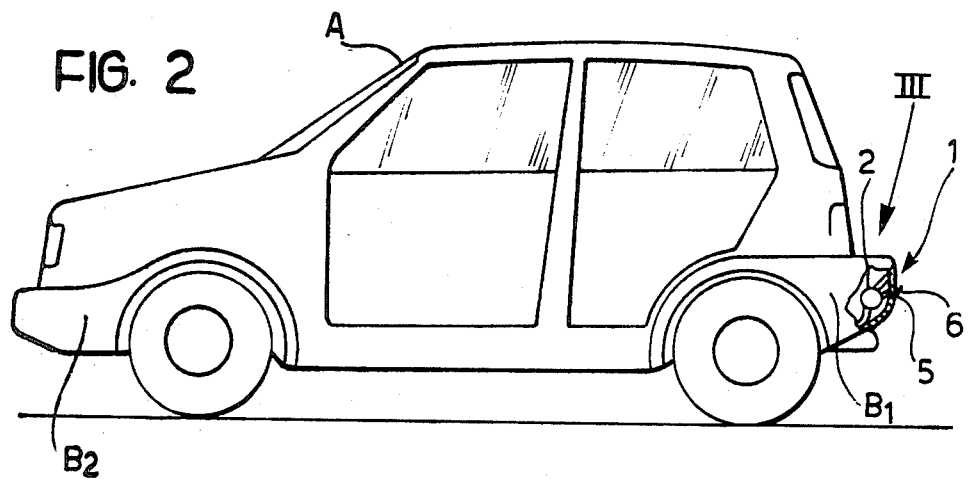
Figure 3:
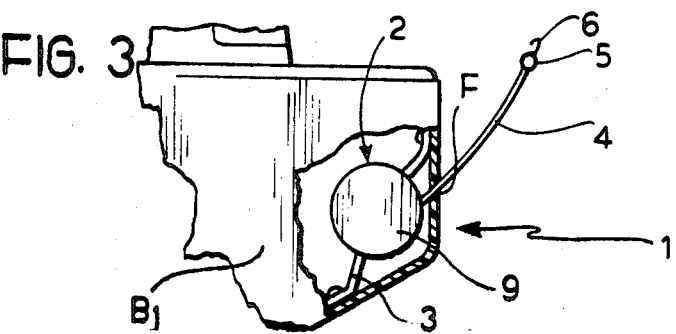

Further characteristics and advantages of the invention will become evident during the detailed description which follows, with reference to the appended drawings provided purely by way of non-limiting example, in which:

FIG. 1 is a schematic perspective view of a protective device according to the invention fitted to a motor vehicle, FIG. 2 is a partially-sectioned, front-elevational view of FIG. 1 with the sheet of the device in its rewound position, FIG. 3 shows a detail of FIG. 2 on an enlarged scale, FIG. 4 is a perspective view, similar to FIG. 1, illustrating another possible use of the protective device, FIG. 5 is a partially-sectioned, longitudinal view of the device on an enlarged scale, and FIG. 6 is a cross-sectional view taken on the line VI—VI of FIG. 5.

In the drawings, a motor vehicle indicated A has a rear bumper $B_1$ and a front bumper $B_2$. In the embodiment illustrated, the bumpers $B_1$, $B_2$ of the motor vehicle A are of the type made by the current plastics-moulding techniques and are hollow to give good shock-absorption characteristics.

A protective device according to the invention, generally indicated 1, is inserted within the the rear bumper $B_1$, parallel thereto. The protective device 1 is constituted essentially by a winding roller 2, having brackets or similar attachments 3 for fixing it permanently within the bumper $B_1$, and a protective sheet 4. The protective sheet 4, which may be a water-proofed sheet, plastics material or any other suitable material, is anchored at one end to the winding roller 2 and projects from the bumper $B_1$ through a longitudinal slot F which is suitably formed in the upper part of this bumper. The end of the sheet 4 opposite that anchored to the roller 2 is located outside the bumper $B_1$ and has an enlargement 5 for preventing it from passing through the slot F and anchorage parts 6 constituted, for example, by hook members.

As illustrated in greater detail in FIG. 5, the winding roller 2 comprises a tubular casing 7 having an axial slot 8 and end caps, only one of which is indicated at 9. These caps 9 support a shaft 10 which extends coaxially within the casing 7 and is locked against rotation relative thereto at 11, a collecting tube 12 being rotatable on the shaft. A resilient mechanism generally indicted 13 is interposed between the shaft 10 and the collecting tube 12 and tends to oppose the rotation of the tube 12 relative to the casing 7 in one sense and to urge the tube to rotate in the opposite sense.

According to the invention, the resilient mechanism 13 is constituted by a plurality of helical torsion springs wound in series on the shaft 10, the end ones reacting at 15 against the tube 12 and the intermediate ones being anchored at their ends to respective spacers 23 rotatable on the shaft 10.

As is clearly illustrated in FIG. 6, the collecting tube 12 also has an axial slot 16 in which there is inserted and held an enlarged end part 17 of the sheet 4 which projects from the winding roller 2 through the axial slot 8 in the casing 7.

The springs 14, as stated, bias the tube 12 to rotate in the sense corresponding to winding of the sheet 4 which, in the absence of an external force opposing the action of the springs 14, is kept wound on the tube 12 within the casing 7. In this condition, the protective device 1 is in its rest configuration illustrated in FIGS. 2 and 3 with the end enlargement 5 of the sheet 4 located against the outer surface of the bumper $B_1$, in the region of the slot F.

As soon as a tractive force is applied to the enlarged part 5, the sheet 4 unwinds from the roller 2 as a result of the rotation of the collecting tube 12 against the action of the springs 14. Consequently the sheet 4 may easily be withdrawn from the casing 7, and hence from the bumper $B_1$, to be extended over the bodywork of the vehicle A until the enlarged part 5 is located close to the front bumper $B_2$. The sheet 4 may then be locked in the extended position by the simple anchoring of the hooks 6 to the front region of the vehicle A, for example to the cooling grill of the engine, to form a serviceable, protective cover as shown in FIG. 1. This operation may be carried out extremely quickly and easily and with a minimum of physical effort.

In order to return the sheet to its initial condition, it suffices to disengage the hooks 6 and allow the sheet 4 to rewind on to the collecting tube 12 under the action of the springs 14, the enlarged part 5 being accompanied towards the rear bumper $B_1$.

The protective device 1 is conveniently equipped with a series of accessories for improving its practicality in use and its functional effectiveness.

These accessories may include, for example, a series of rods 18, of a foldable or telescopic type, which can be used to advantage as support poles for supporting the sheet 4 in an alternative configuration of use illustrated in FIG. 4. The rods 18, which may be provided with wide support bases 19 and possibily with pointed ends so that they can be inserted firmly in the ground, enable the sheet 4 to be formed into a canopy, as an elongation of the vehicle A, behind the rear bumper $B_1$. In order to retain the sheet 4 firmly in this configuration, pegs 20 or like anchoring systems which are conventional in the camping sector, may conveniently be used, these being aanchored for example to the end hooks 6.

Some of the rods 18 may have rest members 21 so that they can be positioned on the roof of the vehicle A in the normal function of the sheet 4 as a protective cover. Thus, as clearly illustrated in FIG. 1, these rods 18 provide the advantage of keeping the corresponding portion of the sheet 4 spaced from the roof of the vehicle A, thus ensuring more effective protection, particularly against hail stones.

A further accessory with which the protective device 1 may conveniently be provided is a reflective indicating element 22, in the form of a triangle, which is applied directly to the portion of the sheet 4 which is disposed along the rear part of the vehicle A in the position of use.

Naturally, the scope of the present invention extends to models which achieve equal utility by using the same innovative concept.

Thus for example, the conformation of the winding roller 2 could clearly be different from that illustrated: for example, this winding roller 2 could be of the type with a rewinding handle or it could have an electric motor for rewinding it. In both cases the resilient mechanism 13 would be omitted.

Moreover, although the embodiment illustrated makes reference to the fitting of the protective device 1 within a hollow bumper, clearly the device could be located elsewhere and, in particular, outside the bumper. In any case it is convenient for the device to be located in the region of one of the bumpers of the vehicle both for aesthetic reasons and for reasons of protection.

Finally it should be noted that the sheet 4 may be provided with members (not illustrated) along its longitudinal edges for the attachment of releasable, lateral protective parts, not illustrated in the drawings, for covering the sides of the vehicle. These members could be zip fasteners or micro-hook connecting elements.

I claim:

1. A protective device for a motor vehicle of the type comprising a flexible cover for covering the bodywork of a motor vehicle, characterised in that the flexible cover comprises a protective sheet (4) having one end (17) anchored to a winding roller (2) adapted for permanent fixing to the vehicle (A) in the region of one of its bumpers ($B_1$, $B_2$), parallel thereto, and the other end having means (6) for anchoring it to the region of the other bumper ($B_2$, $B_1$) of the vehicle A to retain it in its condition of use and further including rods (18) which can be used as poles for supporting the sheet (4) in the form of a canopy as an extension of the vehicle (A) to which the winding roller (2) is attached in use and wherein the rods (18) have rests (21) for their location on the roof of the vehicle (A) to maintain the corresponding portion of the sheet (A) spaced from the roof in its condition in which it covers the vehicle (A).

2. Protective device according to claim 1, characterised in that the winding roller (2) is of the spring-return type (13).

3. Protective device according to claim 2, characterised in that the winding roller (2) comprises a tubular casing (7) for containing the sheet (4) and having an axial slot (8) for the passage of the sheet (4) itself which is wound on a collecting tube (12) rotatable coaxially within the casing (7) and is traversed axially by a shaft (1) which is fixed against rotation relative to the casing (7) and carries a plurality of helical torsion springs disposed in series (14) and reacting against the collecting tube (12).

4. Protective device according to claim 1, characterised in that the winding roller (2) has attachments (3) for fixing it within a hollow bumper ($B_1$, $B_2$) provided with a longitudinal passage (F) through which the sheet (4) can extend outwardly.

* * * * *